(12) United States Patent
Lebert

(10) Patent No.: US 8,650,537 B2
(45) Date of Patent: Feb. 11, 2014

(54) OPTIMIZING AN OBJECT-ORIENTED PROGRAM BY TRANSFORMING INVOCATIONS OF SYNTHETIC ACCESSOR METHODS

(75) Inventor: Berthold Martin Lebert, Phoenix, AZ (US)

(73) Assignee: International Business Machines Corporation, Armonk, NY (US)

(*) Notice: Subject to any disclaimer, the term of this patent is extended or adjusted under 35 U.S.C. 154(b) by 280 days.

(21) Appl. No.: 13/118,525

(22) Filed: May 30, 2011

(65) Prior Publication Data

US 2012/0311531 A1 Dec. 6, 2012

(51) Int. Cl.
G06F 9/44 (2006.01)

(52) U.S. Cl.
USPC ......................................................... 717/108

(58) Field of Classification Search
USPC ......................................................... 717/108
See application file for complete search history.

(56) References Cited

U.S. PATENT DOCUMENTS

| 6,691,303 | B2 | 2/2004 | Guthrie et al. | |
|---|---|---|---|---|
| 6,925,638 | B1 * | 8/2005 | Koved et al. | 717/155 |
| 7,716,645 | B2 | 5/2010 | Dolby et al. | |
| 8,166,468 | B2 * | 4/2012 | Foley et al. | 717/159 |
| 8,418,145 | B2 * | 4/2013 | Cirne et al. | 717/128 |
| 2009/0125881 | A1 * | 5/2009 | Susarla et al. | 717/110 |
| 2011/0258593 | A1 * | 10/2011 | Ng et al. | 717/106 |

OTHER PUBLICATIONS

Hilsdale et al. "Advice Weaving in AspectJ", Mar. 2004, ACM.*
Dmitriev, "LanguageSpecific Make Technology for the Java Programming Language", 2002, ACM.*
Lai, "Java Insecurity: Accounting for Subtleties That Can Compromise Code", Jan./Feb. 2008, IEEE.*
Bowman et al. "Extracting Source Models from Java Programs: Parse, Disassemble, or Profile?", Sep. 1999, ACM.*
Retrologic Systems, "Inner Classes Specification: What are the new binary compatibility requirements for Java 1.1 classes?," Web link: http://www.retrologic.com/innerclasses.doc10.html.
Sun/Oracle Corp., "JDK 1.1 Beta Draft, Inner Classes in Java 1.1," Web link: http://www.public.iastate.edu/~java/docs/guide/innerclasses/html/innerclasses.doc.html.
Anand et al., "SmartRE: An Architecture for Coordinated Network-wide Redundancy Elimination," SIGCOMM'09, Aug. 17-21, 2009, Barcelona, Spain.

* cited by examiner

Primary Examiner — Wei Zhen
Assistant Examiner — Junchun Wu
(74) Attorney, Agent, or Firm — Sughrue Mion, PLLC

(57) ABSTRACT

A method, system and computer program product for optimizing an object-oriented program, which comprises identifying synthetic accessor methods added to the program during a compilation to allow access to the members of the inner classes and replacing the synthetic accessor methods with direct accesses to the members of the inner classes.

18 Claims, 9 Drawing Sheets

OPTIMIZING AN OBJECT-ORIENTED PROGRAM BY TRANSFORMING INVOCATIONS OF SYNTHETIC ACCESSOR METHODS

The invention relates generally to computer software, and more particularly, to optimizing an object-oriented program for which the source code might not be available by identifying and transforming invocations of synthetic accessor methods to access private class members.

BACKGROUND

Objected-oriented programs commonly operate in computers and computer-embedded devices to provide a variety of functions. These programs may be created using object-oriented programming languages such as Java™, C++, and many others. (Java and all Java-based trademarks and logos are trademarks or registered trademarks of Oracle and/or its affiliates.) An object-oriented program operates by manipulating data in the form of objects. An object refers to a real-world object or concept, for example, a bicycle or a bank account. An object-oriented program may be viewed as a collection of cooperating objects.

In object-oriented programming, an object is created when a "class" that defines a particular type of objects is instantiated. An object is thus a particular instance of a class. A class provides the characteristics of its objects, their behavior and abilities. In terms of object characteristics, the class includes the object's attributes, fields or properties, e.g., the bicycles in the class are racing bicycles. In terms of behavior and abilities, the class includes the functions or methods that the objects in the class may perform or behave. For example, a class about bicycles may include methods related to their speed and braking abilities.

A class can have one or more inner classes, which are also known as non-static nested classes. The inner classes have access to private members of the enclosing class and the enclosing class has access to private members of the inner class at compile time. Because the inner classes are compiled into separate class files when a Java program is compiled, a Java virtual machine will enforce the visibility rules for the inner classes just like for any other class. As a result, an inner class cannot access a private member in the enclosing class, and vice versa, at runtime.

To circumvent the above problem, a compiler may insert synthetic accessor methods into the compiled class files to enable an inner class to access the private members of the enclosing class, and vice versa. The synthetic accessor methods that were added by the compiler have the default visibility of "package-private". The package-private visibility allows all classes within the same package (e.g., com.ibm.internal) to access the private methods at runtime. As a result, the synthetic accessor methods enable indirect access by an inner class to the private members of the enclosing class, and vice versa.

The added synthetic accessor methods, however, increase the size of the Java classes and require more memory to run on a Java virtual machine. The amount of memory consumed can add up with a large number of classes and synthetic accessor methods (e.g., this can be up to 2 MB for some Java applications). Furthermore, the addition of the synthetic accessor methods has a negative impact on the performance of the Java program because of the extra invocations of the synthetic accessor methods. For example, there are two invocations when an accessed private class member is a private method: one invocation for a synthetic accessor method and another invocation for the private method.

SUMMARY

The invention provides computer-implemented methods, systems and computer program products for optimizing an object-oriented program that includes a plurality of classes and inner classes, each having a plurality of members, by identifying synthetic accessor methods added to the program during a compilation to allow access to the members of the inner classes by the classes and members outside the inner classes and replacing the synthetic accessor methods with direct accesses to the members of the inner classes.

The details of the preferred embodiments of the invention, both as to its structure and operation, are described below in the Detailed Description section in reference to the accompanying drawings, in which like reference numerals refer to like parts. The Summary is intended to identify key features of the claimed subject matter, but it is not intended to be used to limit the scope of the claimed subject matter.

DETAILED DESCRIPTION OF THE INVENTION

The invention relates generally to computer programming. More particularly, the invention concerns a method, system and computer program product for optimizing object-oriented programs by reducing memory usage due to the synthetic accessor methods. These synthetic accessor methods may be added to a Java program by a compiler to allow the program's inner classes to access private members of an enclosing class, and vice versa, at runtime. The optimization may be performed on the executable code of the program where the program source code may not be available.

Figure 1:
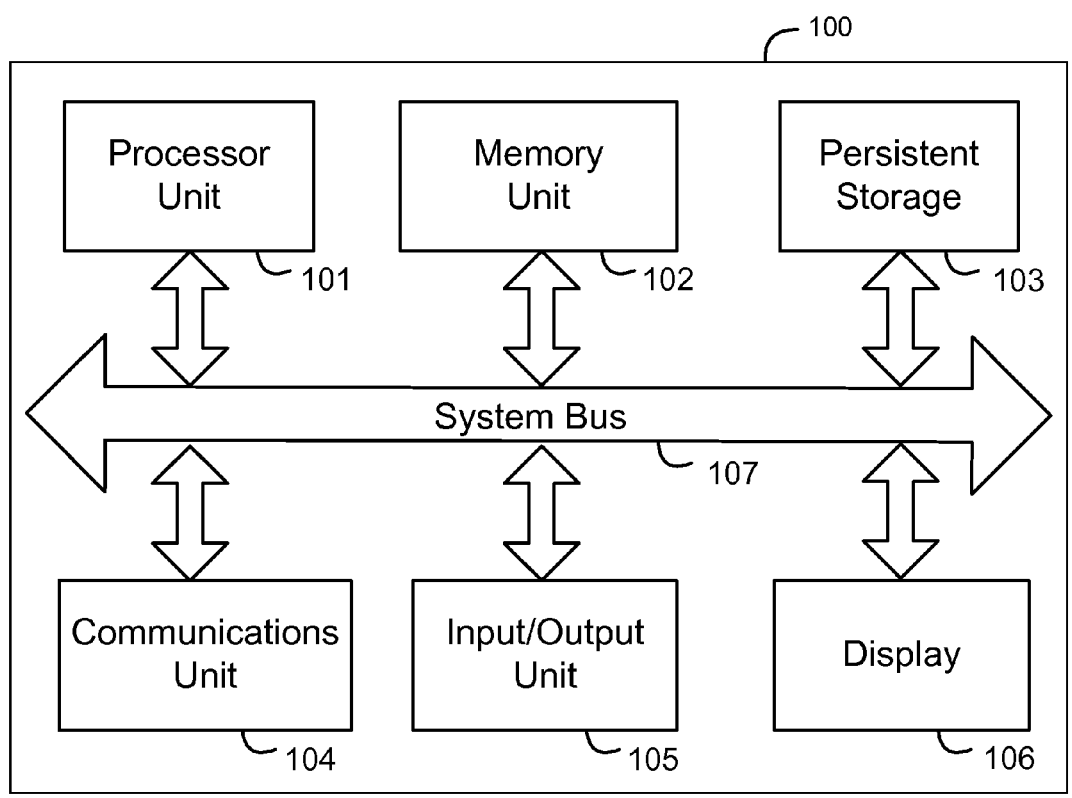
FIG. 1 is a block diagram illustrating the components of an exemplary computer system in which aspects of the invention may be provided.

Referring now to FIG. 1, a block diagram of a computer is illustrated in accordance with an exemplary embodiment of the invention. Computer 100 includes a processor 101, a memory 102, a persistent storage 103, a communications unit 104, an input/output unit 105, a display 106, and system bus 107. As an example, processor unit 101 may include one or more processing cores and computer memory 102 may comprise EEPROM memory modules. Communications unit 104 may include network interface adapters, modems and support software. Input/output unit 105 may include a keyboard, mouse, and printer. Persistent storage 103 may comprise a hard disk drive or an optical disk drive.

Computer programs are typically stored in persistent storage 103 until they are needed for execution, at which time the programs are brought into memory unit 102 so that they can be directly accessed by processor unit 101. Processor 101 selects a part of memory 102 to read or write based on an address in memory 102 provided along with a read or write request. Usually, the reading and interpretation of an encoded instruction at an address causes processor 101 to fetch a subsequent instruction, either at a subsequent address or some other address.

An operating system runs on processor unit 101 to coordinate and control various components within computer 100 and to perform system tasks required by applications running on the computer 100. The operating system may be a commercially available or open source operating system, as are well known in the art. An object-oriented programming system, such as the Java programming system, may run in conjunction with the operating system and provides calls to the operating system from Java programs or applications executing on computer.

Instructions for the operating system, the object-oriented programming system, and applications or programs are located on storage devices, such as a hard disk drive 103. These instructions and may be loaded into main memory 102 for execution by processor 101. The processes of the illustrative embodiments may be performed by processor 101 using computer implemented instructions, which may be located in memory 102.

The system components shown in FIG. 1 can be varied from the illustrative examples shown. In some illustrative examples, computer system 100 may be a personal digital assistant (PDA) configured with flash memory to provide a non-volatile memory for storing operating system files and/or user-generated data. Additionally, computer system 100 can be a tablet computer, laptop computer, or a computer-embedded communication device.

Figure 2:
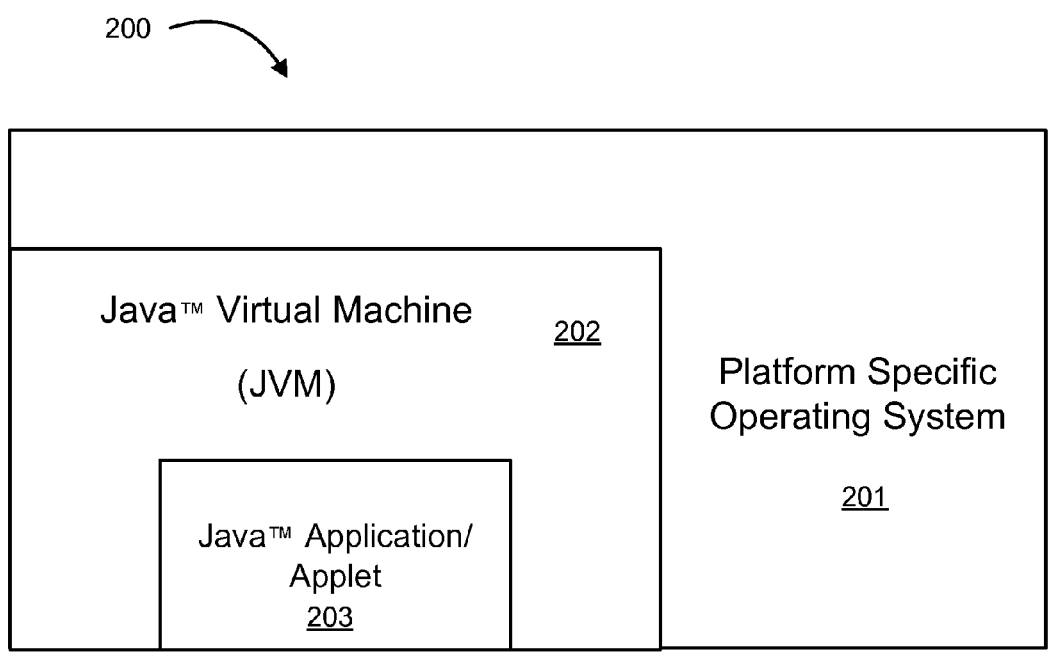
FIG. 2 is a block diagram showing the components of an exemplary Java virtual machine in which aspects of the invention may be provided.

FIG. 2 is a block diagram illustrating the relationship of software components operating within a computer system for providing aspects of an embodiment of the invention. System 200 contains a platform specific operating system 201 that provides hardware and system support to software executing on a specific hardware platform. In the illustrated instance, system 200 is Java based and includes a Java virtual machine 202. However, other embodiments may not be Java based and may include virtual machines other than Java virtual machines.

Java virtual machine 202 is a computer application that may execute in conjunction with the operating system 201. Java virtual machine 202 includes logic components to provide a Java runtime environment with the ability to execute Java application or applet 203. Java application or applet 203 is a program or software component written in the Java programming language. The computer system in which Java virtual machine 202 operates may be similar to computer 100 described in FIG. 1. However, Java virtual machine 202 may be implemented in software or partially in hardware such as a Java chip, Java-on-silicon, or Java processor with an embedded picoJava core.

The Java virtual machine 202 supports a Java runtime environment including architecture, security features, mobility across networks and platform independence. Java virtual machine 202 is a virtual computer, i.e., a computer that is abstractly defined and implemented. This flexibility allows different Java virtual machines 202 to be designed for different types of computer systems, e.g., mainframe computers and PDAs. Java virtual machine 202 allows a program to be executed on different platforms as opposed to only the one platform for which the code was compiled. Programs are compiled for the Java virtual machine 202 before execution. In this manner, applications for many types of computers may be supported, which may contain a variety of central processing units and operating system architectures.

Figure 3:
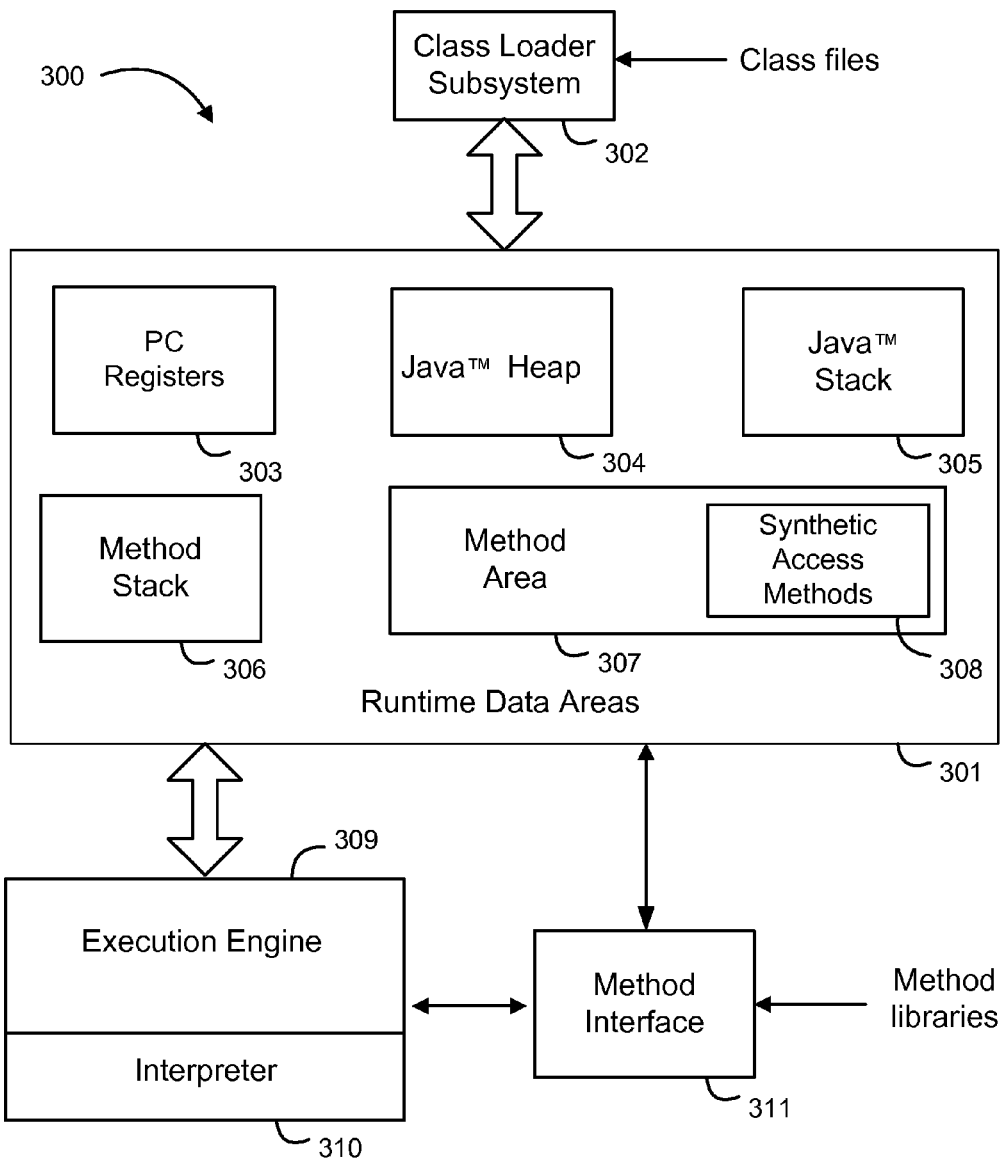
FIG. 3 is a block diagram illustrating a typical memory map of a Java virtual machine at runtime that includes the memory space occupied by components of a Java virtual machine.

FIG. 3 illustrates a block diagram of logic components in a virtual machine 300 at runtime, which is a Java virtual machine in the illustrated instance, but may be a non-Java virtual machine in other embodiments of the invention. Java virtual machine 300 includes a class loader subsystem 302, which is a mechanism for loading Java classes and interfaces. Once the Java virtual machine 300 loads the class files, it executes the bytecodes in them via an execution engine 309. The class loader 302 loads class files from an application and those from application programming interfaces (APIs) that will be needed by the application during runtime. The execution engine 309 that executes the bytecodes may vary across platforms and JVM implementations.

Java virtual machine 300 further contains runtime data areas 301, execution engine 309 and method interface 311. Execution engine 309 is a mechanism for executing instructions contained in the methods of classes loaded by class loader subsystem 302. Interpreter 310 interprets the Java bytecodes at runtime. Method interface 311 allows access to resources in the underlying operating system 201 such as method libraries. Runtime data areas 301 contain program counter (PC) registers 303, Java heap 304, Java stack 305, method stack 306, and method area 307. Method area 307 would include any synthetic accessor methods added to a Java bytecode by a compiler. These different data areas represent the organization of memory needed by Java virtual machine 300 to execute a program.

Java stack 305 may or may not reside within Java heap 304 depending on the implementation of the Java virtual machine 300 at runtime. If the Java stack 305 is in the Java heap 304, then it is represented as a single object for heap management purposes. Whether the Java stack 305 is in the Java heap 304 or not, the Java stack 305 contains meta information indicating frame boundaries for the call stack, method (function) parameters, and also serves as a location for temporary (local) variable and storage for intermediate results. Program counter registers 303 indicate the next instruction to be executed. Method stack 306 stores the state of invocations of native methods. Method area 307 contains class data, while Java heap 304 contains all instantiated objects. Each time a class instance or array is created, the memory for the new object is allocated from Java heap 304. Java virtual machine 300 includes an instruction that allocates memory space within the memory for Java heap 304, but includes no instruction for freeing that space within the memory.

To enable an application to execute on different types of computers, a compiler typically generates an architectureneutral file format that is executable on many processors with the presence of a runtime system. In the case of a Java program, the compiler generates bytecode instructions that are nonspecific to a particular computer architecture. Java bytecode is a platform-independent format that is either interpreted or compiled using a Java virtual machine (JVM) at runtime in order to run on a particular platform. A platform refers to a particular combination of computer and operating system. An interpreter is part of the Java virtual machine that decodes and interprets bytecode.

Figure 4:
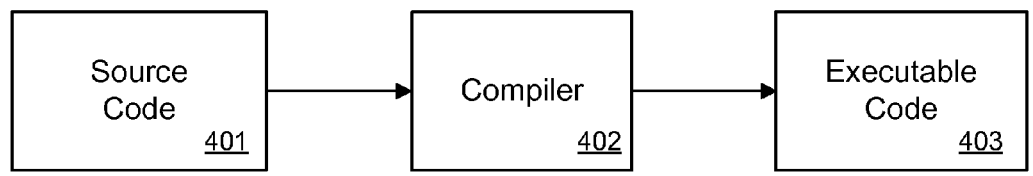
FIG. 4 is a block diagram showing a compiler that generates bytecode in which aspects of the invention may be provided.

FIG. 4 is a block diagram of an example compiler. Source code 401 is created by one or more programmers or automatically by a software development tool. Compiler 402 and executable code 403 are computer usable programs that can be used in a data processing system, such as computer 100 in FIG. 1. Source code 401 defines how a program operates. Although the source code 401 is in a format that is easier for a human to understand, it is not in a format ready for execution on a computer. The source code 401 is typically converted to a computer-executable format referred to as object code, or bytecode as in the case of a Java program, by a compiler 402.

Compiler 402 is a computer program that translates a series of statements written in a first computer language, such as source code 401, into a second computer language, such as executable code 403. The second computer language, such as executable code 403, is generally in a desired computer-usable format and is ready for use in a computer.

Typically, compiler 402 generates objects that contain machine code augmented by information about the name and location of entry points and external calls to functions not contained in the object. A set of object files, which need not have come from a single compiler provided that the compilers used share a common output format, may then be linked together to create the final executable code. The executable code can then be run directly by a user.

In object-oriented programming, each object is capable of receiving messages, processing data, and sending messages to other objects. An object is created when a "class" that defines a particular type of data objects is instantiated. A class defines the characteristics of a data object (or field) which include, for example, the object's attributes or properties. The class further defines an object's behavior, i.e., what an object in the class can do. These operations are referred to as methods, functions, or functional members.

Each class may contain many methods and data members. Methods contain the instructions to run the program. Each object instantiated by the class includes its own set of data as specified by the data members of the class, and the functional members of any given object are capable of acting on the data members of the object.

Figure 5:
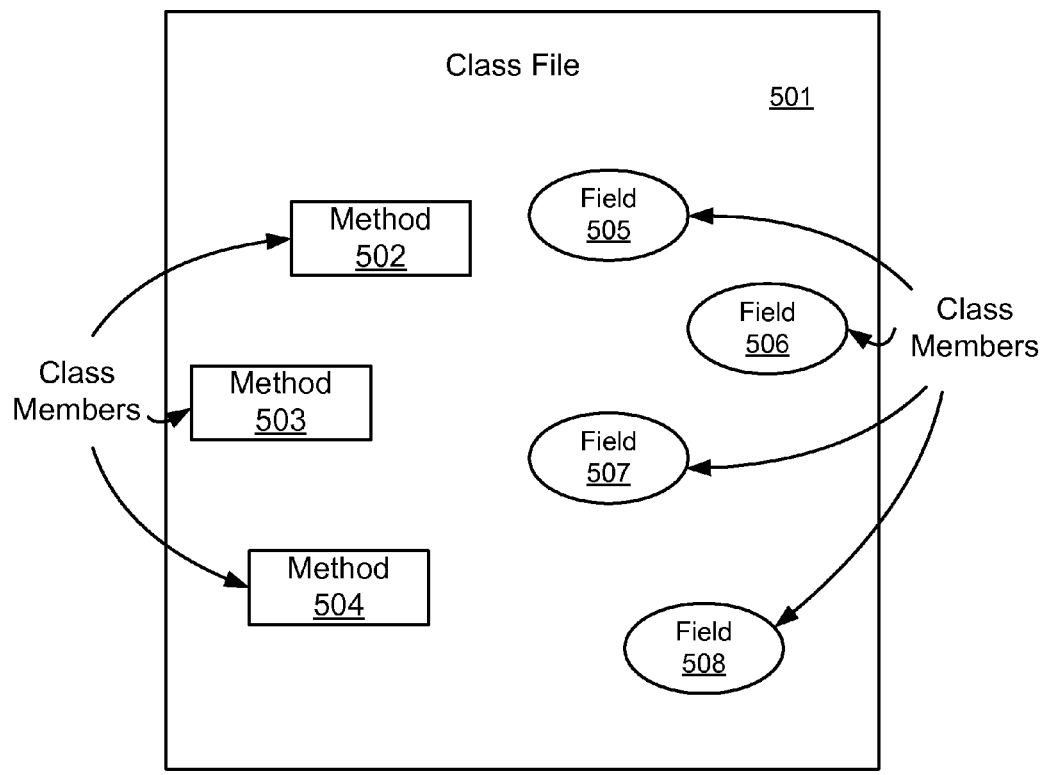
FIG. 5 is a block diagram illustrating the relationship of class members in a class file that includes methods and fields.

FIG. 5 illustrates the relationship between a class file and the class members, which include fields and methods. A class file is a structure that maintains the definition of a class and its members prior to runtime. A class file 501 may comprise many methods or functions 502-504 wherein each includes computer instructions in the form of bytecode to perform a desired operation. The class file 501 may further comprise multiple data fields 505-508 wherein each of the data fields 505-508 defines the attributes of a data object when the data field is instantiated.

Figure 6:
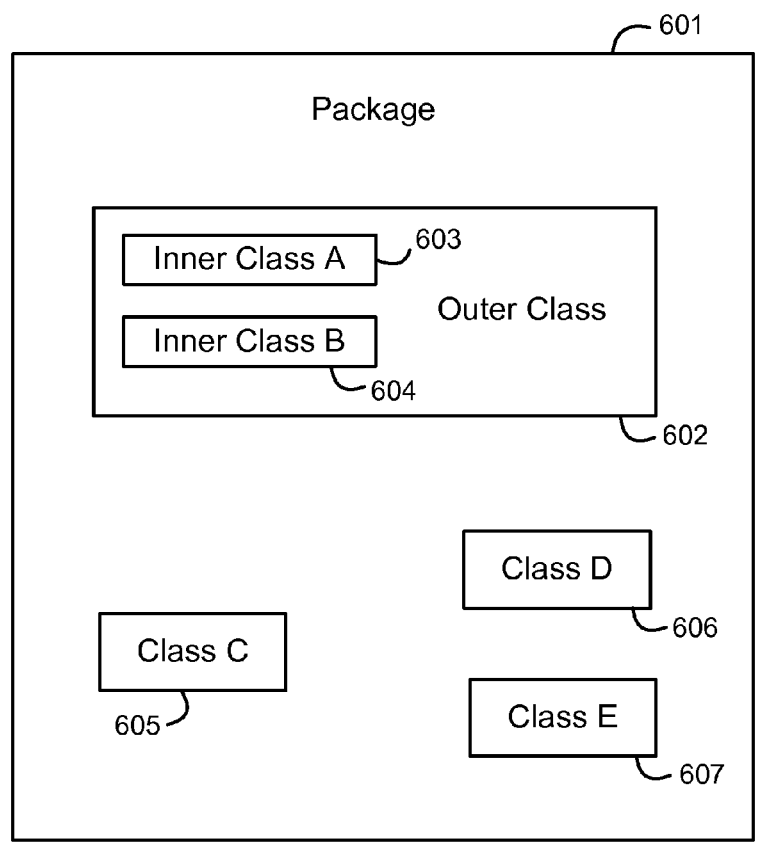
FIG. 6 illustrates the relationship among inner classes, outer class, and package, which may be applicable to embodiments of the invention.

FIG. 6 illustrates different types of classes in object-oriented programs. An object-oriented program may contain one or more packages. A package is a collection of classes that are grouped together by functionality in the same folder (or directory). As illustrated in FIG. 6, a package 601 may comprise one or more outer classes and inner classes. An inner class is a class that is defined within, or as part of, the outer class. A class may include one or more inner classes. For example, the illustrated outer class 602 includes inner class A (603) and inner class B (604). Like methods and fields in a class, the inner classes 603-604 are also class members of the enclosing outer class 602. An outer class of the compiled computer program may include a method that comprises instructions to create an instance of an inner class. In addition to the outer class 602 and inner classes 603-604, the object-oriented program package 601 may include classes 605-607 (i.e., classes C, D, and E).

Java programming defines visibility rules that restrict the access to classes and its members from other classes. There are currently four visibility rules for Java classes: public, protected, private, and public-private. All classes, subclasses and their members can access a public class. A class member that is declared as "private" is only accessible from within the class itself, i.e., the owning class. Access from other classes will result in a runtime exception. For a "protected" class, only classes, subclasses and class members in the same package can access it. A class member that is declared as "package-private" is only accessible from within the class itself, i.e., the owning class, and the classes that belong to the same package (e.g., a file folder or directory). For example, if the class is "com.ibm.MyClass", then all classes in the "com.ibm." package (or folder) are allowed access to the class member declared as "package-private".

Figure 7:
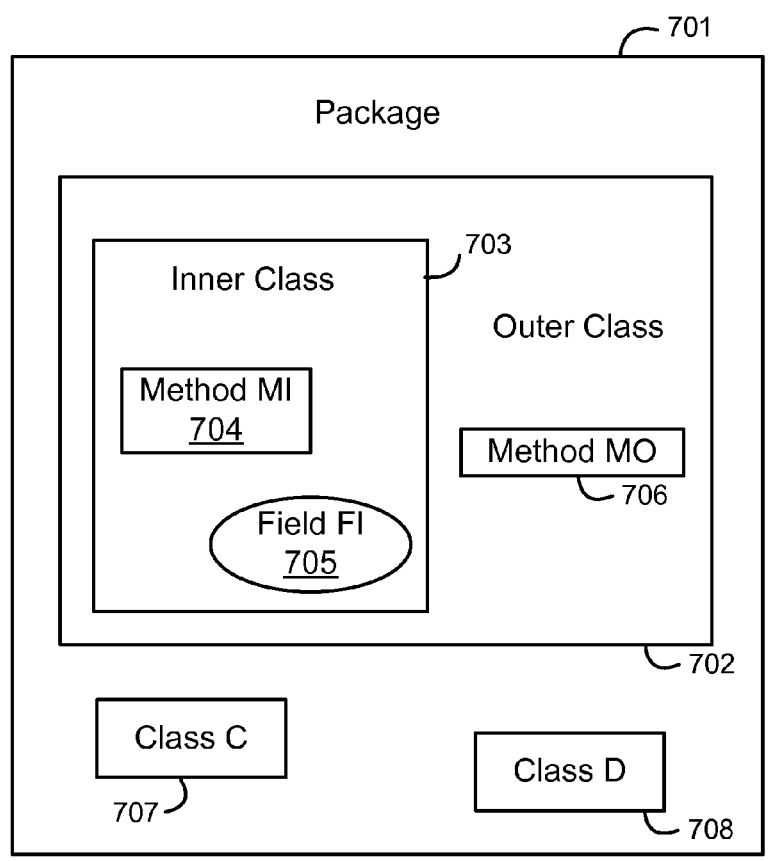
FIG. 7 is a block diagram illustrating examples of a private class member, a class designated as package-private, and a method call involving a private class member.

FIG. 7 illustrates an example of a private member and a package-private member. Package 701 may comprise an outer class 702 and classes 707-708. Outer class 702 may comprise an inner class 703 and method MO 706. Inner class 703 may comprise a method MI 704 and data field FI 705. The method MI 704 and data field FI 705 are private members to the inner class 703 and thus accessible only by the methods and data fields in the inner class 703. A class member outside the inner class 703, such as method MO 706, would not be able to access the private method MI 704 and private field FI 705 without a modification of the bytecode by a compiler. Similarly, the class members in classes 707-708 would not be able to access the private method MI 704 and private field FI 705 under the normal visibility rules of object-oriented programs, since these class members are outside the inner class 703.

In object-oriented programs, the inner classes have access to private members of the enclosing class and the enclosing class has access to private members of the inner class. Because the inner classes are compiled into separate class files at compilation, a Java virtual machine will enforce the visibility rules. As a result, the inner class would not be able to access a private member in the enclosing class, and vice versa, at runtime. In order to allow the inner class to access a private member at runtime, the compiler 402 may add synthetic accessor methods to the output bytecode.

Alternatively, a Java developer may declare certain class members as "package-private" as described above. However, this option is not available when an application is assembled from many components and the developer does not have access to their source files or there are restrictions to modify the source. Embodiments of the invention identify the synthetic accessor methods added to a compiled program and replacing them with direct accesses to the private members of the class, as an optimization following the program compilation.

The program optimization may be implemented in a compiler or transformation tool, such as those described with respect to FIG. 3, and run in a computer such as computer 100 shown in FIG. 1. An example of an optimization tool for the Java programming language is the IBM Java Optimizer tool "Japt". The program optimization reduces the amount of system memory used by the program as the memory that synthetic accessor methods require is no longer needed. Besides the performance improvements, the modification to the compiled program does not any effect on the program at runtime.

Figure 8:
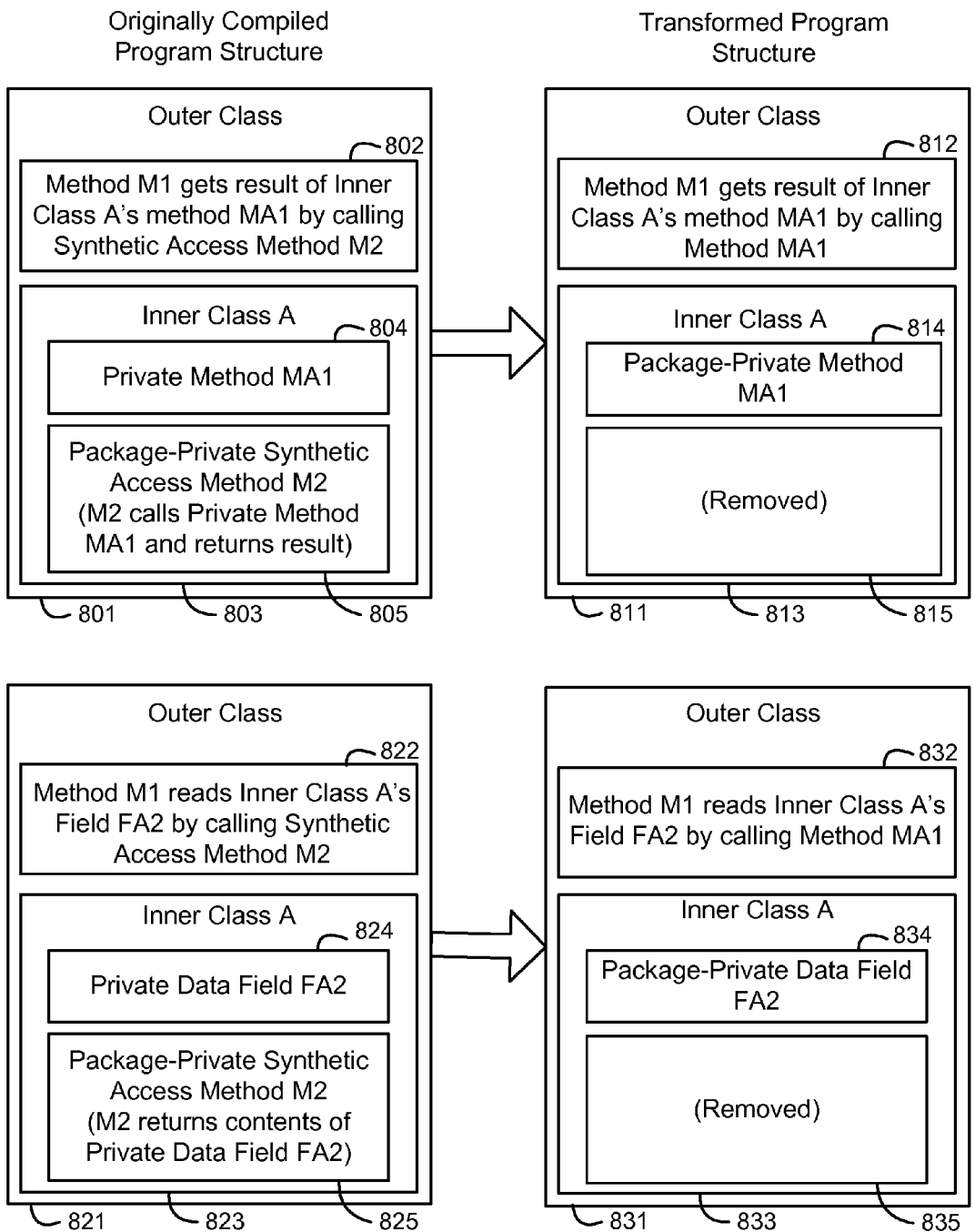
FIG. 8 is a flowchart of an exemplary process for optimizing bytecode to remove synthetic accessor methods, in accordance with an embodiment of the invention.

FIG. 8 illustrates an example of a program transformation to replace the invocations of the synthetic accessor methods added by a compiler with direct accesses to the private class members, according to an embodiment of the invention. The synthetic accessor methods have the default visibility of a private package, which means that all classes of the same package (e.g., com.ibm.internal) are allowed to access these synthetic accessor methods at runtime and would have indirect access to the private members of the enclosing or inner class.

In the example illustrated in FIG. 8, an originally compiled program structure may comprise an outer class 801 which includes two class members: a method M1 802 and an inner class A 803. The inner class A 803 comprises a method MA1 804 and a synthetic accessor method M2 805. The method MA1 804 and synthetic accessor method M2 805 are both "package-private" to the inner class A 803 in a typical compilation. As a result, they are only accessible to the members within the inner class A 803. However, as described with reference to FIG. 7, a compiler 402 may add the synthetic accessor method M2 805 to the inner class A 803 to allow classes and class members outside the inner class A 803 to access the private members of the inner class A 803, and vice versa. The synthetic accessor method M2 805 thus calls the private method MA1 and returns result when the bytecode is executed. In addition, since the method M1 802 is outside the inner class A 803, it also needs to call the synthetic accessor method M2 805 in order to invoke the method MA1 804, which is a private method in the inner class A 803.

FIG. 8 further illustrates a transformed program structure 811 by the program optimizer to identify invocations of synthetic accessor methods in the originally compiled program 801 and modify them according to the type of the invocations. At a high level, the transformation identifies invocations of the added synthetic accessor methods, changes the visibility status of the affected private class members, and replaces invocations of the synthetic accessor methods by direct invocations of the now accessible private methods. The removal of the synthetic accessor methods reduces the amount of system memory used by the program at runtime.

The program transformation includes changing a private method invoked by a synthetic accessor method, such as method MA1 804, to a package-private method MA1 814. The program optimizer further identifies the added synthetic accessor methods by examining a "synthetic" flag bit in each method declaration to determine whether the method is a synthetic accessor method. The compiler 402 sets a "synthetic" flag bit in a method declaration when it generates the method. If the examined method is a method M1 802, which obtains the result of a private method MA1 by calling a synthetic accessor method M2 805, then the optimizer replaces the examined method invocation with a direct invocation of the private method MA1, as shown by box 812. The optimizer may remove the synthetic accessor method M2 805 (that was added by the compiler 402) from the transformed program 811, as shown in box 815.

FIG. 8 further illustrates an exemplary program transformation in which the synthetic accessor methods are invoked to read private data fields. Invocations of the of synthetic accessor methods to write private data fields may be similarly transformed. The transformation comprises changing a private data field FA2 824 that is read by a synthetic accessor method M2 825, to a package-private field FA2 834. If an examined method M1 822 invokes the synthetic accessor method M2 825 to read (or write) the private data field FA2 824, then the optimizer replaces the invocation of the synthetic accessor method M2 825 with a direct read (or write) access of the data field FA2 834. The optimizer may remove the synthetic accessor method M2 825 (that was added by the compiler 402) from the transformed program 831, as shown in box 835.

Figure 9:
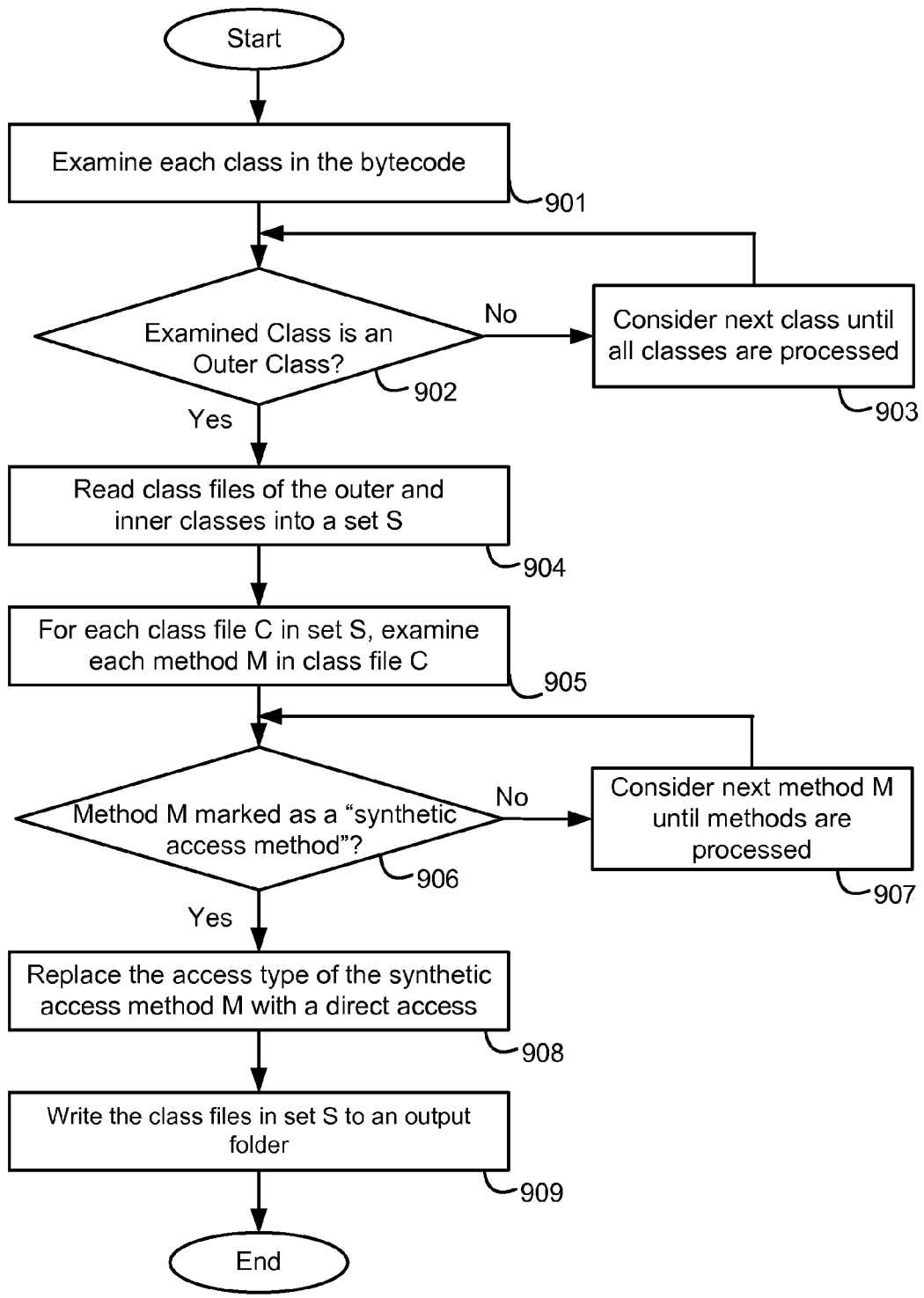
FIG. 9 is a flowchart illustrating in more detail the replacement of synthetic accessor methods with direct accesses to read and write private data field accesses and direct invocations of private methods, in accordance with an embodiment of the invention.

FIG. 9 illustrates a flowchart of an exemplary process for optimizing an object-oriented program, in accordance with aspects of an embodiment of the invention. The program optimization represented by the flowchart is an example of a Java program, but may be a non-Java program in other embodiments of the invention. At block 901, the program optimizer examines each class file in the bytecode of a program. If a class is not an outer class, per the determination in step 902, then the optimizer examines another class in the bytecode until all of the classes are examined, per step 903. If an examined class is an outer class, then the optimizer reads the class files of the outer class and its inner classes in to a set S at step 904 for further processing.

For each class C in set S, the optimizer examines each method M in class C (step 905) and determines whether the method M is a synthetic accessor method (step 906). This determination may include examining whether the compiler 402 has set a "synthetic" flag bit in the declaration of a method to indicate that the method is a synthetic accessor method. If the method M is not a synthetic accessor method, then the optimizer examines another method in class C, per step 907, until all the methods in the class C are processed. If an examined method M is a synthetic accessor method, then the optimizer replaces the invocations of the synthetic accessor method with a direct access, depending on the type of the invocation, at step 908. The replacement of the invocations of a synthetic accessor method is described in more detail with reference to FIG. 10. The optimizer may write the resulting class files in set S to an output folder at step 909.

Figure 10:
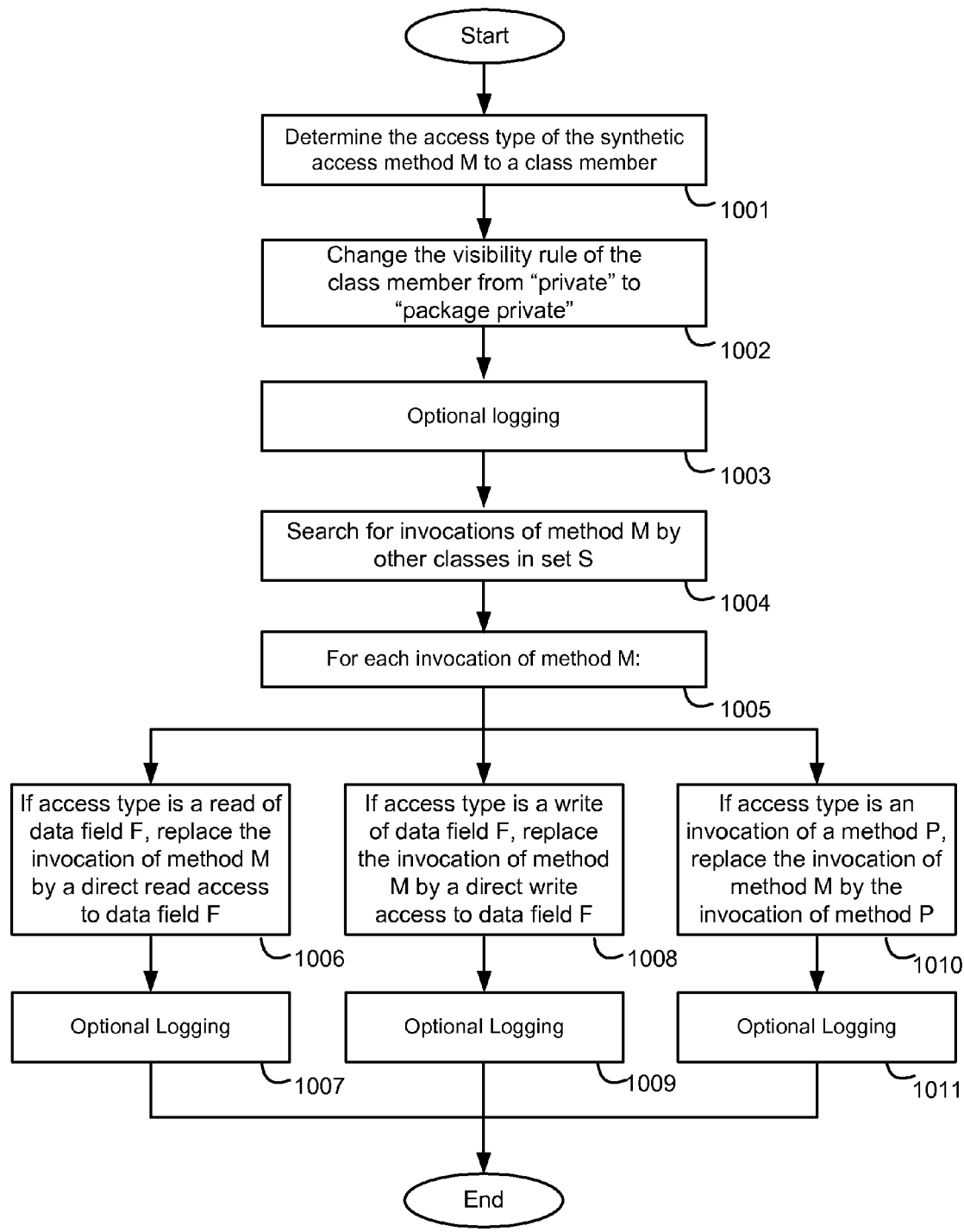
FIG. 10 is a flowchart illustrating, in more detail, an exemplary process for handling the invocations of a synthetic accessor method from step 908 of FIG. 9 according to an exemplary embodiment.

FIG. 10 is a flowchart illustrating in more detail and exemplary process for handling the invocations of a synthetic accessor method from step 908 of FIG. 9. At step 1001, the optimizer may determine the type of access that a synthetic accessor method M is invoked for a class member, e.g., a method invocation or a field read/write access. The optimizer changes the visibility rule for the involved private class member from "private" to "package-private" at step 1002. The user may set an option in the optimizer to log such a change. In that case, the optimizer may log the change in a file to be output at the end of the optimization, per step 1003. The optimizer searches for all invocations of the examined method M by the classes in set S, at step 1004. For each invocation of the synthetic accessor method M, at step 1005, the optimizer considers the type of invocation and transforms the program accordingly in steps 1006-1011 in order to remove the synthetic accessor method M from the program.

In the illustrated embodiment, if the synthetic accessor method M is invoked to read a private data field F, then the optimizer replaces the invocation of method M by a direct read access to private data field F, at step 1006. This replacement may be logged in an output file if the user has selected a logging option, at step 1007. If the synthetic accessor method M is invoked to write a private field, then the optimizer replaces the invocation of method M by a direct write access to private data field F, at step 1008. This replacement may be logged in an output file if the user has selected a logging option, at step 1009. If the synthetic accessor method M is used to call a private method P, then the optimizer replaces the invocation of method M by a direct invocation of the private method P, at step 1010. This replacement may be logged in an output file if the user has selected a logging option, at step 1011.

The illustrative embodiments have been performed on existing Java programs. In the case of many programs, including those in small electronic devices, such as cell phones, these space savings are quite significant.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, or the connection may be made to an external computer, for example, through the Internet using an Internet Service Provider.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for optimizing an object-oriented program including a plurality of classes and inner classes each having a plurality of members, the method comprising:
   identifying synthetic accessor methods added to the program during a compilation to allow access to the members of the inner classes by the classes and members outside the inner classes; and
   replacing the synthetic accessor methods with direct accesses to the members of the inner classes,
   wherein at least one synthetic accessor method invokes private method and the replacing comprises:
      designating the private method as a package-private method; and
      replacing an invocation of said at least one synthetic accessor method by an invocation of the package-private method, and
   wherein a class member that is declared as private is only accessible from within the class itself, and a class member that is declared as package-private is only accessible from within the class itself, and the classes that belong to the same package.

2. The method of claim 1, wherein the synthetic accessor methods are identified based on a synthetic flag.

3. Then method of claim 1, further comprising removing said at least one synthetic accessor method from the program.

4. The method of claim 1, wherein at least one synthetic accessor method invokes a private method to access a private data field and the replacing comprises:
   designating the private data field as a package-private data field; and
   replacing each invocation of said at least one synthetic accessor method by a direct access to the package-private data field.

5. The method of claim 4, wherein the direct access is a read access to the package-private data field.

6. The method of claim 4, wherein the direct access is a write access to the package-private data field.

7. The method of claim 1, further comprising logging the replacement of the synthetic accessor methods in an output log file.

8. The method of claim 1, wherein the inner classes are compiled into separate class files.

9. The method of claim 1, wherein the program is in the form of bytecode.

10. The method of claim 1, wherein the program is a Java program.

11. The method of claim 1, wherein the program is optimized before runtime.

12. The method of claim 1, wherein each of the classes and inner classes comprises a plurality of methods and data fields.

13. A non-transitory computer readable medium storing computer program product for optimizing an object-oriented program including a plurality of classes, the classes and inner classes each having a plurality of members, the product comprising a computer readable medium having program code embodied therein, the program code comprising:
   program code configured to identify synthetic accessor methods added to the program during a compilation to allow access to the members of the inner classes by the classes and members outside the inner classes; and
   program code configured to replace the synthetic accessor methods with direct accesses to the members of the inner classes,
   wherein at least one synthetic accessor method invokes a private method and the program code for the replacing comprises:
      program code configured to designate the private method as a package-private method; and
      program code configured to replace an invocation of said at least one synthetic accessor method by an invocation of the package-private method, and
   wherein a class member that is declared as private is only accessible from within the class itself, and a class member that is declared as package-private is only accessible from within the class itself, and the classes that belong to the same package.

14. The computer program product of claim 13, wherein the synthetic accessor methods are identified based on a synthetic flag.

15. The computer program product of claim 13, wherein the program code comprises program code configured to remove said at least one synthetic accessor method from the program.

16. A system including a processor for optimizing an object-oriented program including a plurality of classes, some of the classes including a plurality of inner classes, the classes and inner classes each having a plurality of members, the system comprising:
   a logic component for identifying synthetic accessor methods added to the program during a compilation to allow access to the members of the inner classes by the classes and members outside the inner classes; and
   a logic component for replacing the synthetic accessor methods with direct accesses to the members of the inner classes,
   wherein at least one synthetic accessor method invokes a private method and the logic component for the replacing comprises:
      a logic component for designating the private method as a package-private method; and
      a logic component for replacing an invocation of said at least one synthetic accessor method by an invocation of the package-private method, and
   wherein a class member that is declared as private is only accessible from within the class itself, and a class member that is declared as package-private is only accessible from within the class itself, and the classes that belong to the same package.

17. The system of claim 16, wherein at least one synthetic accessor method invokes a private method to access a private data field and the system comprises:
   a logic component for designating the private data field as a package-private data field; and
   a logic component for replacing each invocation of said at least one synthetic accessor method by a direct access to the package-private data field.

18. The system of claim 17, further comprising a logic component for logging the replacement of the synthetic accessor methods in an output log file.

* * * * *